(12) United States Patent
Chen et al.

(10) Patent No.: US 8,186,647 B2
(45) Date of Patent: May 29, 2012

(54) SOLENOID VALVE

(75) Inventors: Chieh-Cheng Chen, Taoyuan Hsien (TW); Ming-Chih Tsai, Taoyuan Hsien (TW); Chien-Chia Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 818 days.

(21) Appl. No.: 12/250,798

(22) Filed: Oct. 14, 2008

(65) Prior Publication Data
US 2009/0242815 A1 Oct. 1, 2009

(30) Foreign Application Priority Data
Mar. 28, 2008 (TW) ................................ 97111252 A (51) Int. Cl.
*F16K 31/02* (2006.01)
(52) U.S. Cl. ................ 251/129.2; 251/129.15; 251/230; 74/57
(58) Field of Classification Search ............. 251/129.15, 251/230, 252; 74/57, 110; *F16K 31/44*
See application file for complete search history.

(56) References Cited

U.S. PATENT DOCUMENTS

| 1,765,377 | A | * | 6/1930 | Marks | 251/129.2 |
| 4,221,238 | A | * | 9/1980 | Madsen | 137/627.5 |
| 4,262,879 | A | * | 4/1981 | Gonner | 251/230 |
| 4,349,177 | A | * | 9/1982 | Shimada et al. | 251/230 |
| 4,355,685 | A | * | 10/1982 | Beck | 166/240 |
| 4,632,361 | A | * | 12/1986 | Callison | 251/230 |
| 4,650,001 | A | * | 3/1987 | Ringgenberg | 166/373 |
| 4,736,798 | A | * | 4/1988 | Zunkel | 166/321 |
| 4,790,512 | A | * | 12/1988 | Lindsay | 251/129.2 |
| 5,318,120 | A | * | 6/1994 | Hisaw | 166/250.07 |
| 5,518,073 | A | * | 5/1996 | Manke et al. | 166/240 |
| 5,573,224 | A | * | 11/1996 | Kim | 251/30.04 |
| 6,047,949 | A | * | 4/2000 | Beauchemin, Jr. | 251/257 |
| 2004/0026085 | A1 | * | 2/2004 | Vacik et al. | 166/373 |

* cited by examiner

*Primary Examiner* — John Rivell
*Assistant Examiner* — Matthew W Jellett
(74) *Attorney, Agent, or Firm* — Muncy, Geissler, Olds & Lowe, PLLC (57) ABSTRACT

A solenoid valve includes a bobbin, a coil, a rod, and at least one ball. The bobbin has a through hole and a multiple-turning-point groove in the inner wall of the bobbin. The coil winds around the bobbin. The rod is disposed in the through hole and is capable of moving inward or outward along the through hole, and has a recess in the outer wall of the rod. Each ball is received in the groove and the recess at the same time.

19 Claims, 10 Drawing Sheets

SOLENOID VALVE

CROSS REFERENCE TO RELATED APPLICATIONS

This Non-provisional application claims priority under 35 U.S.C. §119(a) on Patent Application No(s). 097111252 filed in Taiwan, Republic of China on Mar. 28, 2008, the entire contents of which are hereby incorporated by reference.

BACKGROUND OF THE INVENTION

1. Field of the Invention

The invention relates to a solenoid valve, and more particularly to a self-latch solenoid valve using a mechanism without a permanent magnet.

2. Description of the Related Art

A conventional self-latch solenoid valve switches a stretching position and a shrinking position via electrification to a coil. After cutting off the power supply, a rod holds the same position as that before cutting off the power supply. After cutting off the power supply, the conventional self-latch solenoid valve attracts the rod via magnetic force of a magnet for saving power and the rod is fixed at the shrinking position so that a normal open function is provided by the solenoid valve.

Figure 1A:
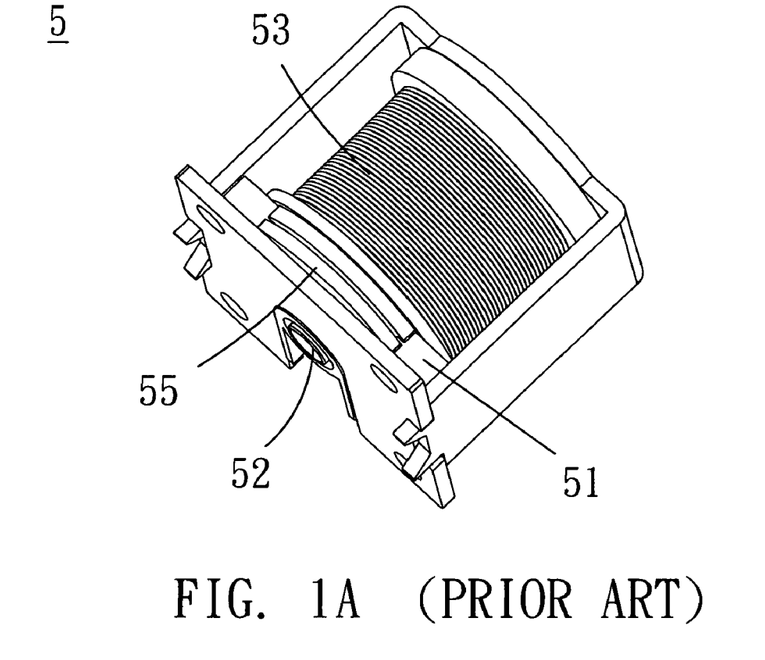
FIGS. 1A and 1B are schematic views of a conventional self-latch solenoid valve.
Figure 1B:
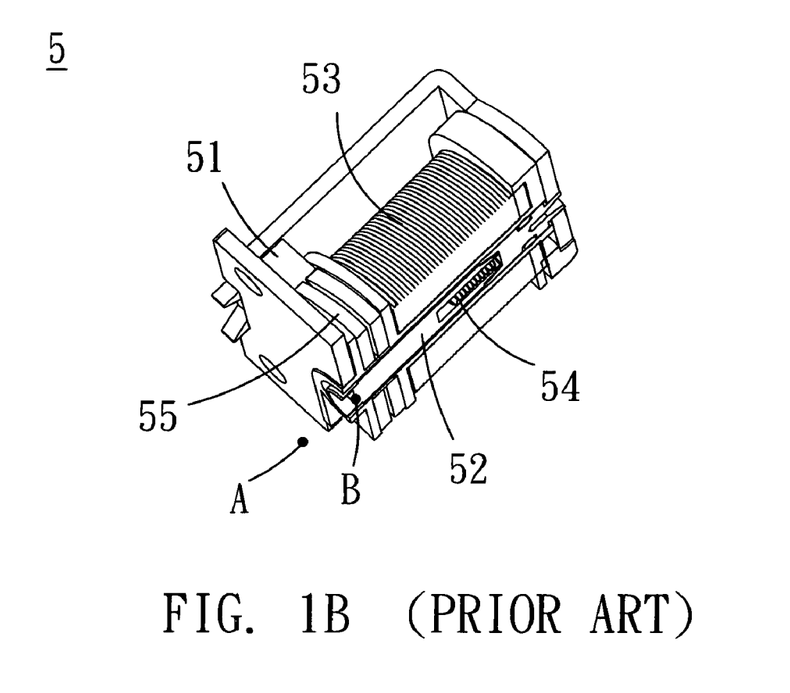

FIG. 1A is a schematic view of a conventional self-latch solenoid valve. FIG. 1B is a schematic view of the conventional self-latch solenoid valve in FIG. 1A that a part of its structure is removed. As shown in FIGS. 1A and 1B, the solenoid valve 5 includes at least a permanent magnet 51, a rod 52, a coil 53, and a spring 54.

The rod 52 of the solenoid valve 5 shown in FIG. 1B is disposed at a shrinking position F. When applying a current to the solenoid valve 5, the coil 53 generates excitation phenomenon to provide a magnetic attraction to attract the rod 52. The rod 52 moves from a stretching position E to the shrinking position F. When the rod 52 moves to the shrinking position F, the permanent magnet 51 is attracted to fix the rod 52. At this time, a power source is closed and the permanent magnet 51 continues to attract and fix the rod 52. Thus, the normal open function is provided for the solenoid valve 5.

To apply a reverse current (contrary to the direction of the current on the above-mentioned paragraph) to the coil 53, a reverse magnetic field is generated to neutralize the magnetic force of the permanent magnet 51 so that the spring 54 pushes the rod 52 to the stretching position E. At this time, the power source is closed and a normal close function is provided for the solenoid valve 5.

However, when using the solenoid valve 5, a driving circuit must include a positive and a negative phase bridge circuit to control the solenoid valve 5 and reduce energy resource waste for saving power. The solenoid valve 5 generally includes an attached mechanism 55 for fixing the permanent magnet 51. The above-mentioned design substantially increases manufacturing costs.

Figure 2A:
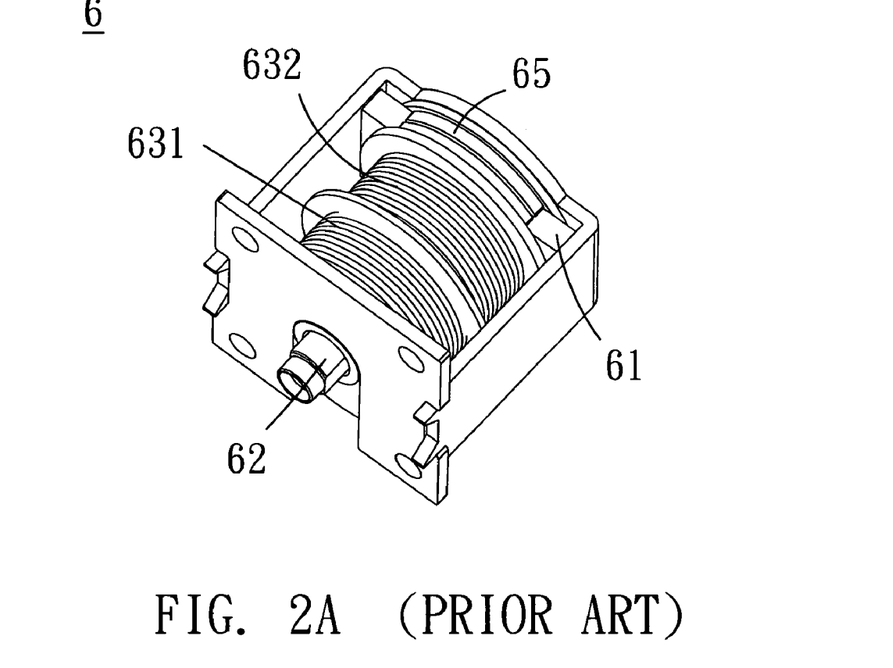
FIGS. 2A and 2B are schematic views of another conventional self-latch solenoid valve.
Figure 2B:
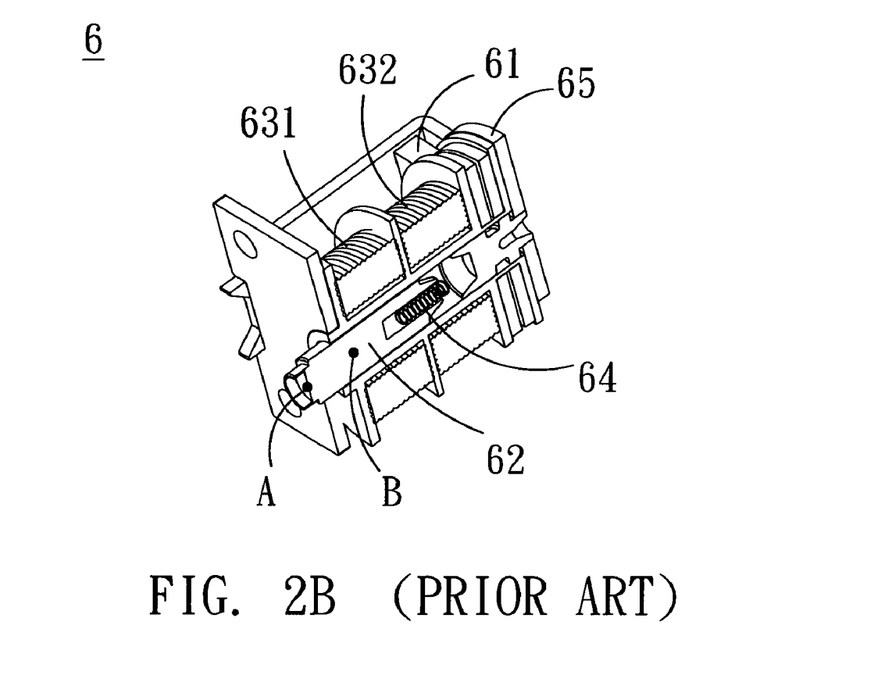

FIG. 2A is a schematic view of another conventional self-latch solenoid valve. FIG. 2B is a schematic view of the other self-latch solenoid valve in FIG. 2A that a part of its structure is removed. A solenoid valve 6 includes at least a permanent magnet 61, a rod 62, a first coil 631, a second coil 632, a spring 64 and an attached mechanism 65 for fixing the permanent magnet 61.

Referring to FIGS. 2A and 2B, the rod 62 of the solenoid valve 6 is disposed at the stretching position E. Referring to FIG. 2B, when applying a current to the first coil 631, the first coil 631 generates excitation phenomenon to provide a magnetic attraction to attract the rod 62. The rod 62 moves from the stretching position E to the shrinking position F. When the rod 62 moves to the shrinking position F, the permanent magnet 61 is attracted to fix the rod 62. At this time, a power source is closed and the permanent magnet 61 continues to attract and fix the rod 62. Thus, a normal close function is provided for the solenoid valve 6.

When applying a current to the second coil 632, the second coil 632 generates excitation phenomenon to provide a magnetic attraction to attract the rod 62 in a reverse direction. The rod 62 moves from the shrinking position F to the stretching position E. When the rod 62 moves to the stretching position E, the rod 62 is divorced from the attraction of the permanent magnet 61. At this time, the spring 64 provides fixation for the rod 62 to make sure the rod 62 to hold at the stretching position E. Then, a power source is closed and the normal close function is provided for the solenoid valve 6.

The solenoid valve 6 is equipped with a digital switching on a circuit for controlling and switching the first and second coils 631, 632 of the solenoid valve 6 so that the energy resource waste can be reduced and the power can be saved. The solenoid valve 6 generally has the attached mechanism 65 for fixing the permanent magnet 61 and includes the first and second coils 631, 632. The above-mentioned design not only increases the number of elements but also manufacturing cost and complexity.

BRIEF SUMMARY OF THE INVENTION

The objective of the present invention is to provide a solenoid valve which mitigates the above-mentioned problems. The mechanism design eliminates the permanent magnet and the attached mechanism and directly provides a solenoid valve for a normal open function and a normal close function. Thus, advantages such as power saving, decreased number of elements, a more simplified manufacturing process, decreased manufacturing costs and a more simplified circuit design, are provided.

To reach the above objective, the present invention provides a solenoid valve includes a bobbin having a through hole and a multiple-turning-point groove in the inner wall of the bobbin; a coil, winding around the bobbin; a rod, disposed in the through hole and capable of moving inward or outward along the through hole, and having a recess in the outer wall of the rod; and at least a ball, received in the groove and the recess at the same time. The solenoid valve further includes a spring disposed in a recess of the bottom portion of the rod for the outward thrust. When the rod is disposed at a stretching position, the ball gets stuck at a stretching stuck point of the multiple-turning-point groove. When the rod is disposed at a shrinking position, the ball gets stuck at a shrinking stuck point of the multiple-turning-point groove. The rod generates an excitation phenomenon by applying a voltage to the coil for a magnetic attraction to control the rod from moving inward or outward.

In summary, the solenoid valve of the invention achieves a normal open function and a normal close function via a sliding ring, a rotating ring, and the multiple-turning-point groove, eliminating the permanent magnet and the attached mechanism, saving power, reducing the number of elements, simplifying the manufacturing process, and decreasing manufacturing costs. Meanwhile, for design simplification of the driving circuit, the voltage is an impulse voltage.

BRIEF DESCRIPTION OF DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Please refer to the following drawings, a solenoid valve of the embodiment of the present invention is described.

Figure 3A:
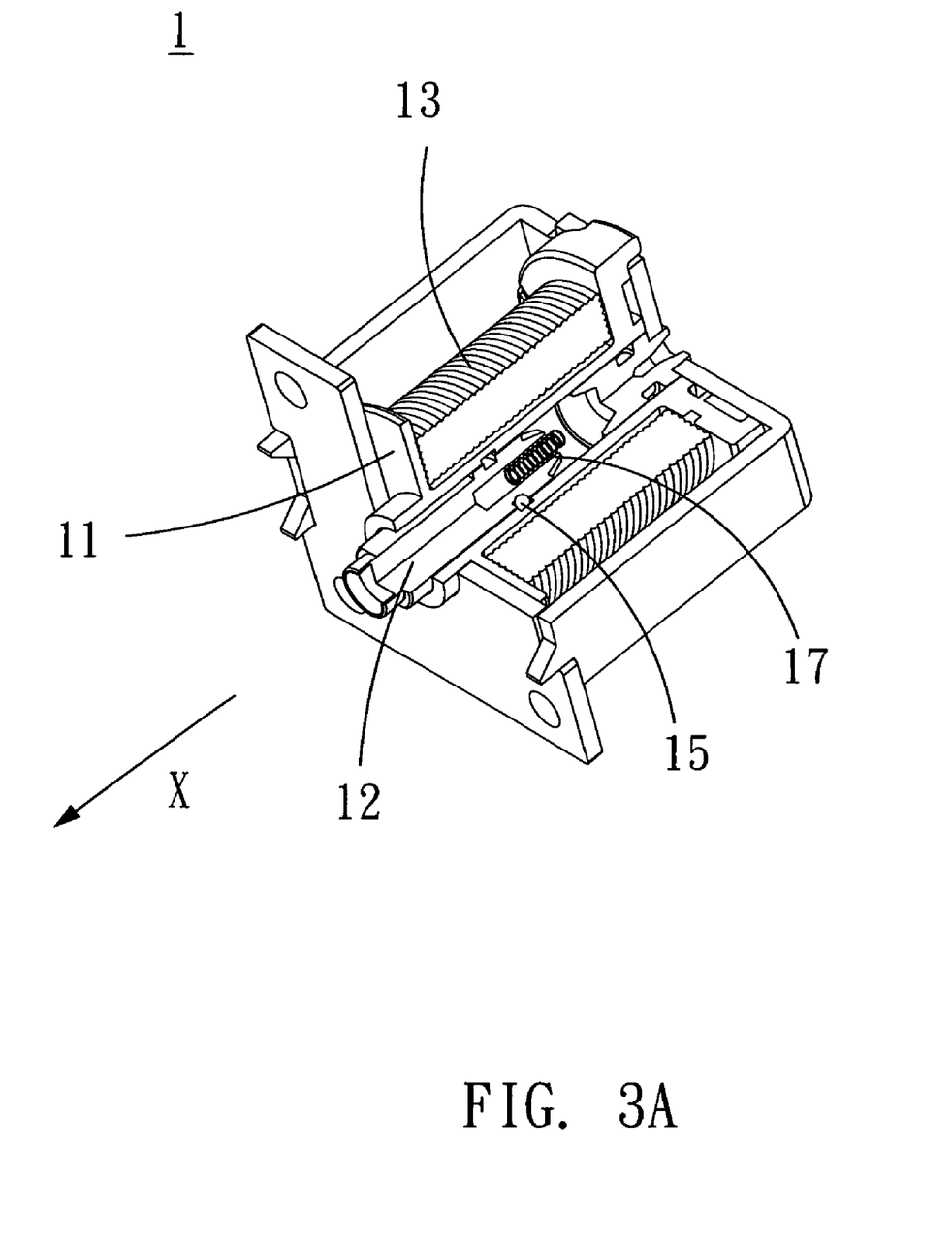
FIG. 3A is a schematic view showing a solenoid valve according to an embodiment of the present invention that a part of its structure is removed.
Figure 3B:
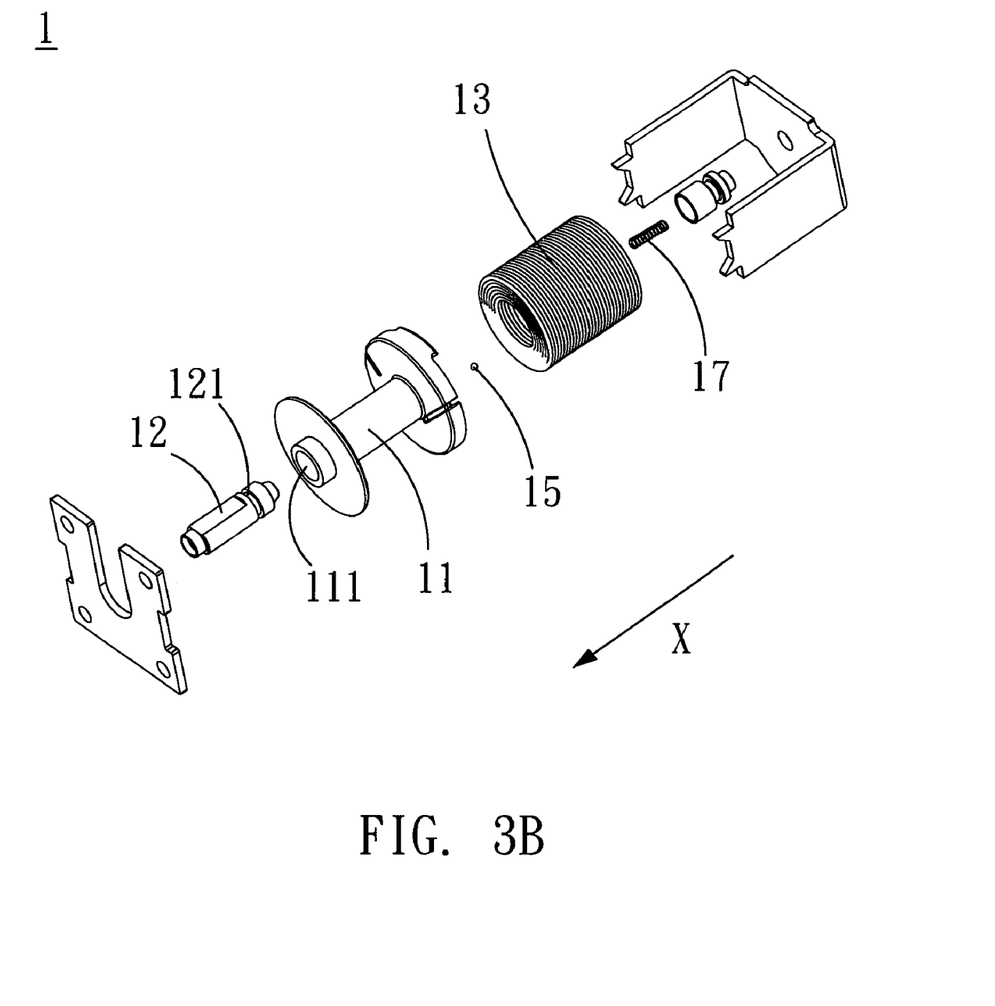
FIG. 3B is an exploded view of the solenoid valve of the embodiment shown in FIG. 3A.

FIG. 3A is a schematic view showing a solenoid valve according to an embodiment of the present invention that a part of its structure is removed. FIG. 3B is an exploded view of the solenoid valve of the embodiment shown in FIG. 3A. The solenoid valve 1 includes a bobbin 11, a rod 12, a coil 13 and at least a ball 15 and a spring 17.

Figure 4:
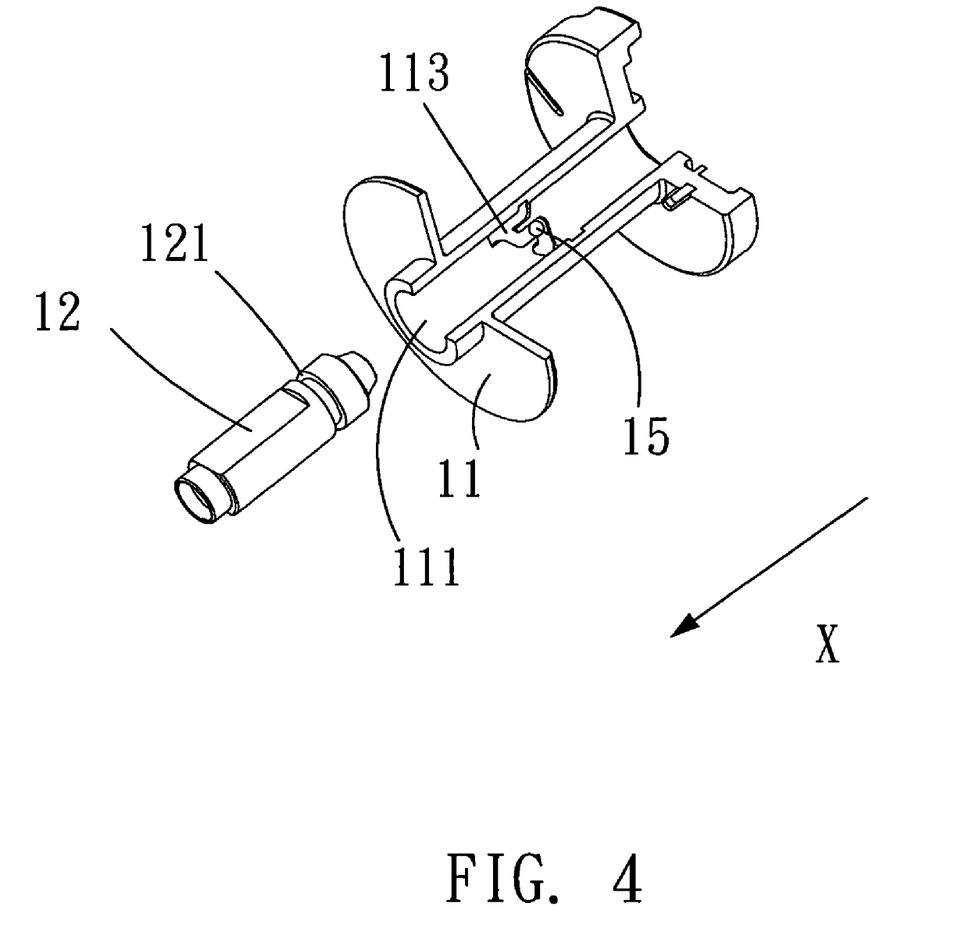
FIG. 4 is a schematic view showing a rod and a solenoid valve according to the embodiment of the present invention that a part of its structure is removed.

FIG. 4 is a schematic view showing a rod and a solenoid valve according to the embodiment of the present invention that a part of its structure is removed. The bobbin 11 includes a through hole 111 and a multiple-turning-point groove 113 in the inner wall of the bobbin 11.

As shown in FIGS. 3A and 3B, the coil 13 winds around the bobbin 11. The rod 12 is a movable core disposed in the through hole 111 and capable of moving inward or outward along an axis X of the through hole 111. The rod 12 includes a recess 121 disposed on the periphery of the rod 12. The ball 15 is received in the groove 113 and the recess 121 at the same time. One part of the ball 15 is received in the recess 121 and the other part thereof is received in the groove 113. When the rod 12 moves inward or outward along the through hole 111, the ball 15 moves in the multiple-turning-point groove 113. The spring 17 is disposed in a recess of the bottom portion of the rod 12 or put around the rod 12 outside of the through hole 111 for an outward thrust. The outward thrust can be gravitation but not limited thereto.

Figure 5:
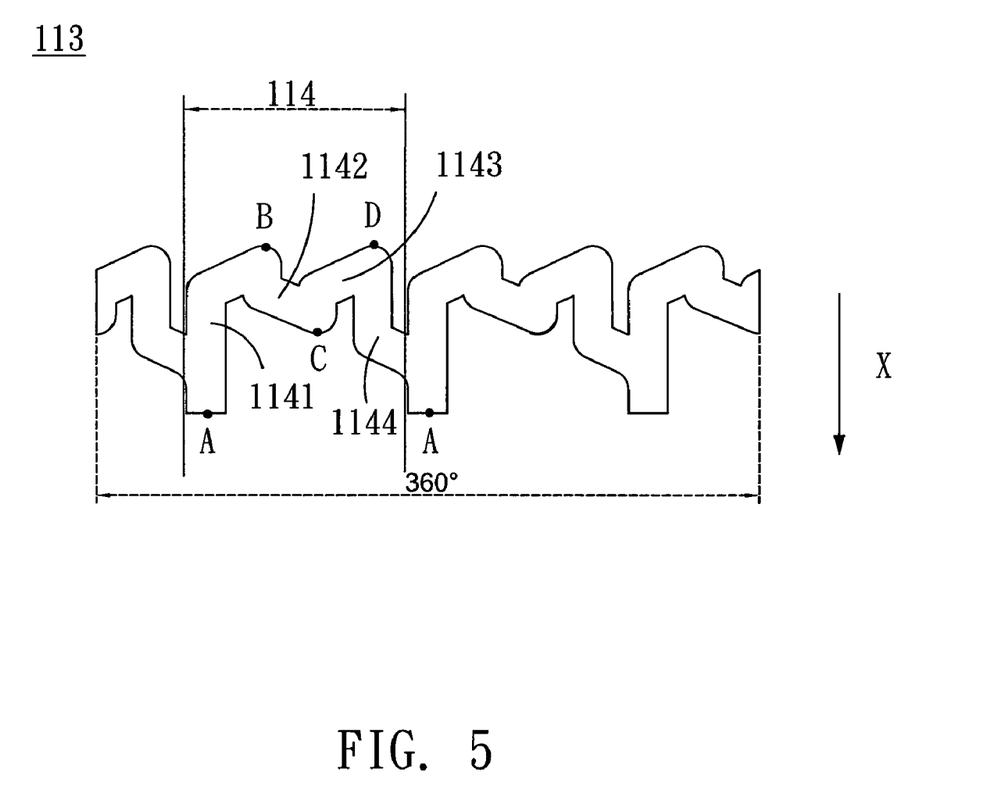
FIG. 5 is an expanded 360 degree view of a groove of a bobbin of the present invention.

FIG. 5 is an expanded 360 degree view of a groove disposed at the inner wall of the bobbin of the present invention. The groove 113 includes a plurality of substantially M-shaped grooves 114. In this embodiment, the groove 113 disposed at the inner wall of the bobbin 11 is formed by a combination of three substantially M-shaped grooves 114, which are connected continuously. The number of the groove is not limited to three. The substantially M-shaped groove 114 is formed by a combination of a first shrinking groove 1141, a first retreating groove 1142, a second shrinking groove 1143 and a second retreating groove 1144, which are connected continuously. The first shrinking groove 1141 of one of the substantially M-shaped grooves 114 protrudes inward from a stretching stuck point A to a first turning point B. The first retreating groove 1142 protrudes outward from the first turning point B to a shrinking stuck point C. The second shrinking groove 1143 protrudes inward from the shrinking stuck point C to a second turning point D. The second retreating groove 1144 protrudes outward from the second turning point D to the stretching stuck point A of the adjacent substantially M-shaped grooves 114.

Since the ball 15 moves in the substantially M-shaped groove 114, the number of balls 15 may be one, equal to or less than that of substantially M-shaped grooves 114. In this embodiment, the number of balls 15 can be three. The three balls 15 correspond to the positions of the three substantially M-shaped grooves 114.

When applying voltage to the coil 13 of the solenoid valve 1, an excitation effect is generated to provide a magnetic attraction for attracting the rod 12. The rod 12 shrinks from a stretching position to a shrinking position. The voltage is an impulse voltage or a transient digital signal. FIGS. 6A to 6G are continuous views showing how a rod moves between a stretching position and a shrinking position. The detailed description is disclosed as follows.

Figure 6A:
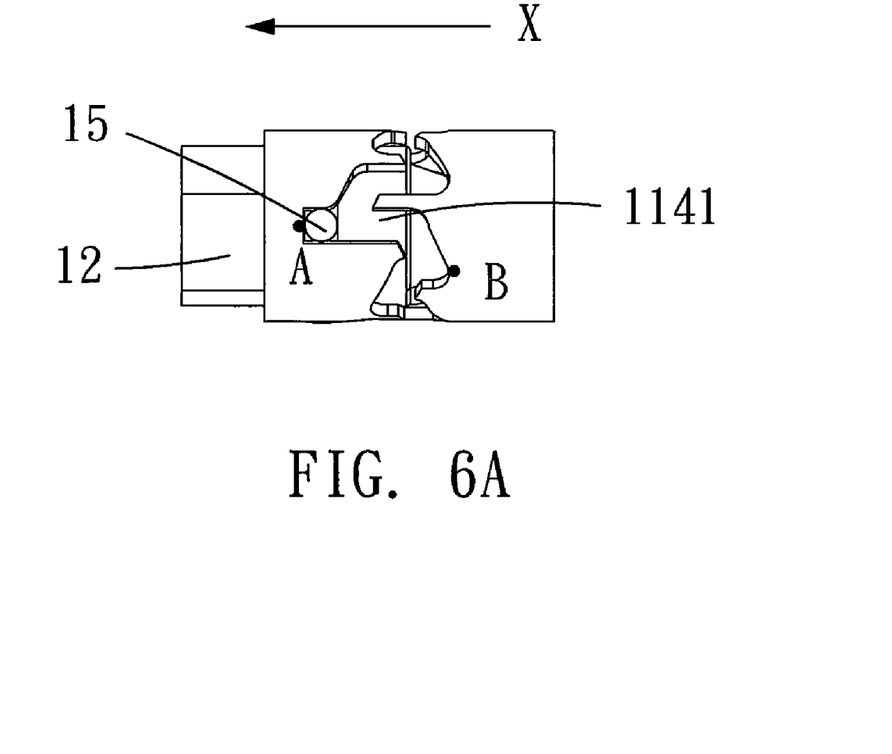
FIGS. 6A to 6G are continuous views showing how a rod moves between a stretching position and a shrinking position.
Figure 6B:
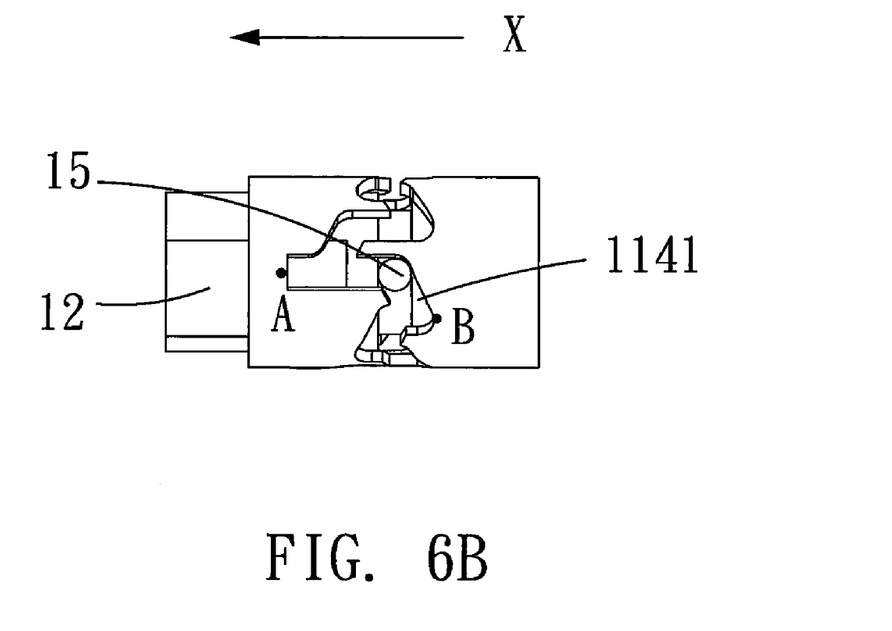
Figure 6C:
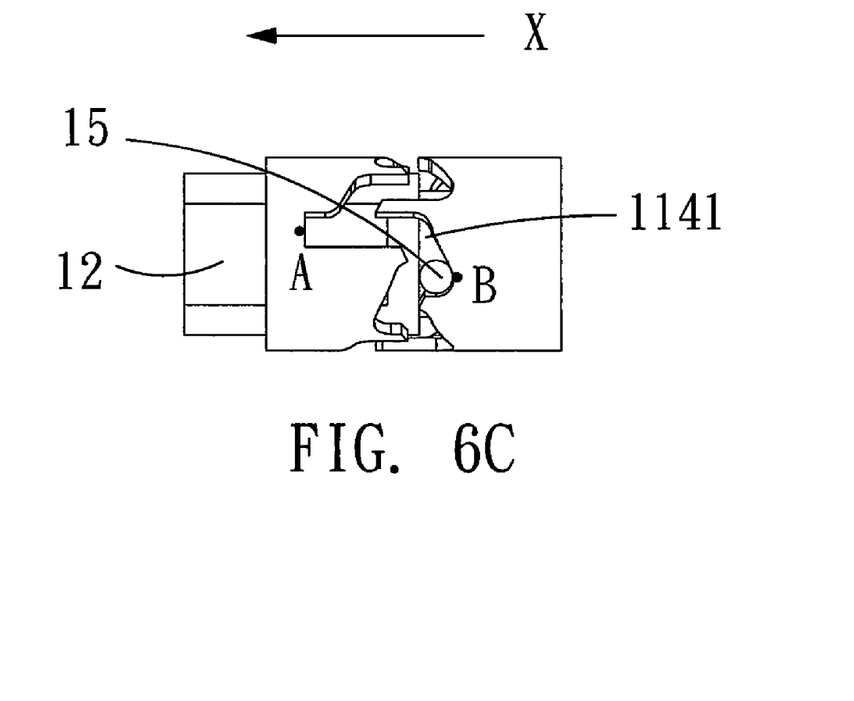

Referring to FIG. 6A, when the rod 12 is disposed at the stretching position, the ball 15 gets stuck at the stretching stuck point A, and thus, the rod 12 achieves a normal close function. Referring to FIGS. 6B and 6C, the rod 12 shrinks via the excitation effect, and the ball 15 moves inward from the stretching stuck point A to the first turning point B along the first shrinking groove 1141.

Figure 6D:
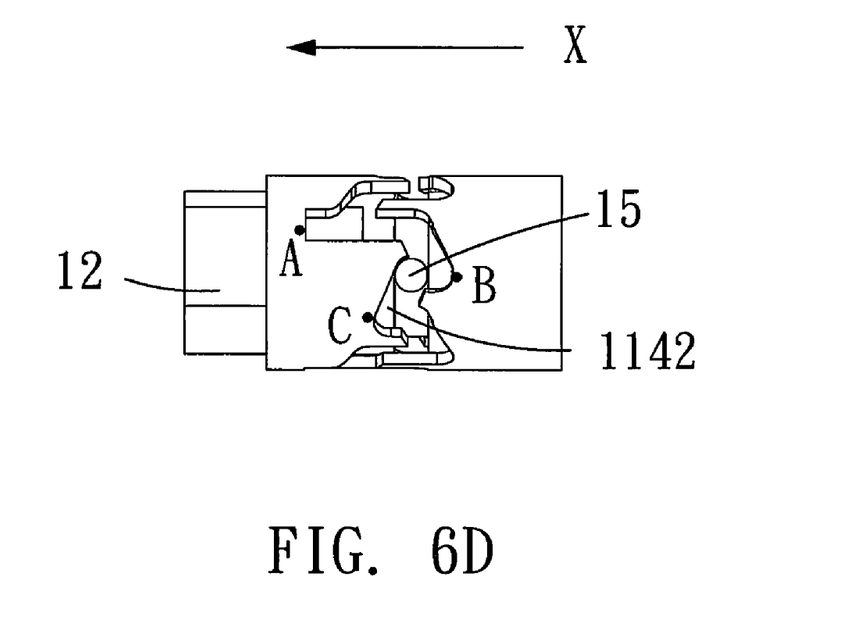
Figure 6E:
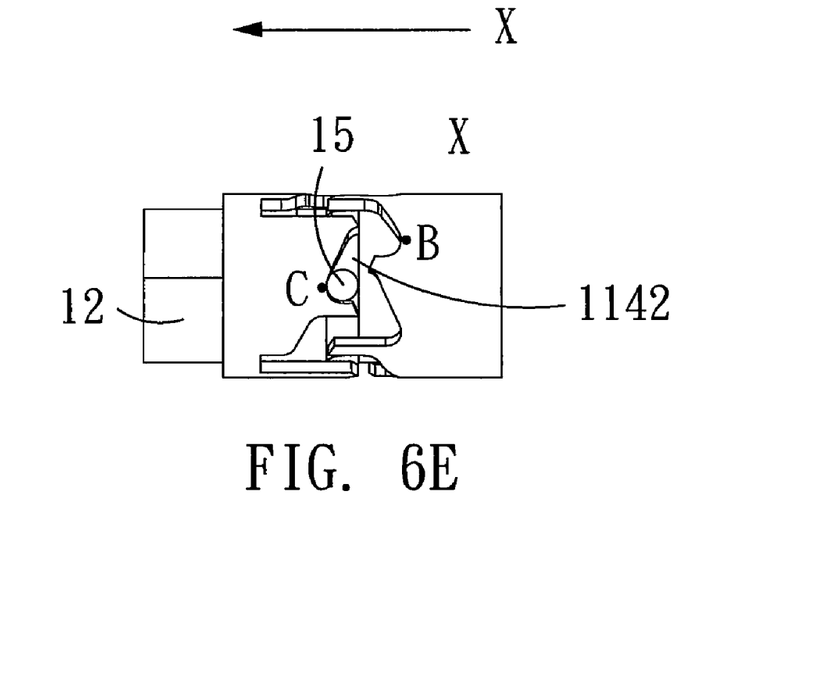

Referring to FIGS. 6D and 6E, when no voltage is applied to the coil 13, the rod 12 pushes the ball 15 to move outward from the first turning point B to the shrinking stuck point C along the first retreating groove 1142 via the outward thrust and then the rod 12 stays at the shrinking position. Thus, the rod 12 is held at a normal open position.

Figure 6F:
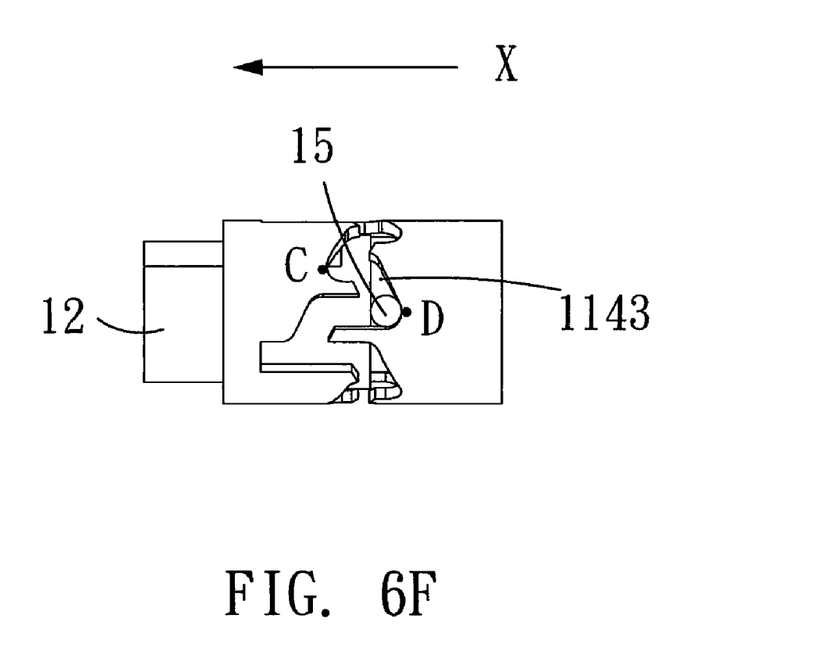

When the rod 12 is disposed at the shrinking position, the ball 15 gets stuck at the shrinking stuck point C of the substantially M-shaped grooves 114. Referring to FIG. 6F, the rod 12 shrinks via the excitation effect, and the ball 15 moves inward to the second turning point D along the second shrinking groove 1143.

Figure 6G:
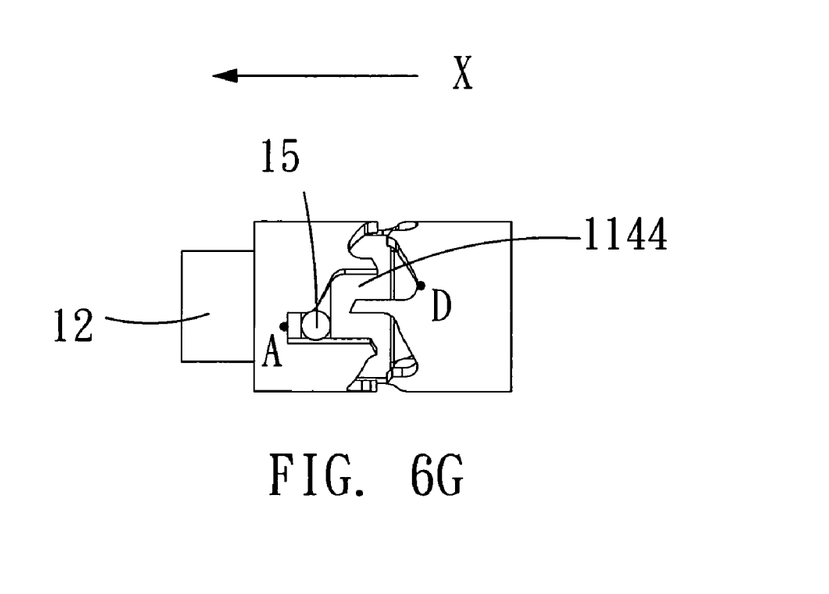

Referring to FIG. 6G, when no voltage is applied to the coil 13, the rod 12 pushes the ball 15 to move outward from the second turning point D to the stretching stuck point A of the next substantially M-shaped grooves 114 along the second retreating groove 1144 via the outward thrust and then the rod 12 stays at the stretching position. Thus, the rod 12 is held at a normal close position.

Therefore, the rod 12 generates an excitation effect by applying an impulse voltage to the coil 13 for a magnetic attraction to control the rod 12 from moving inward or outward.

Figure 7:
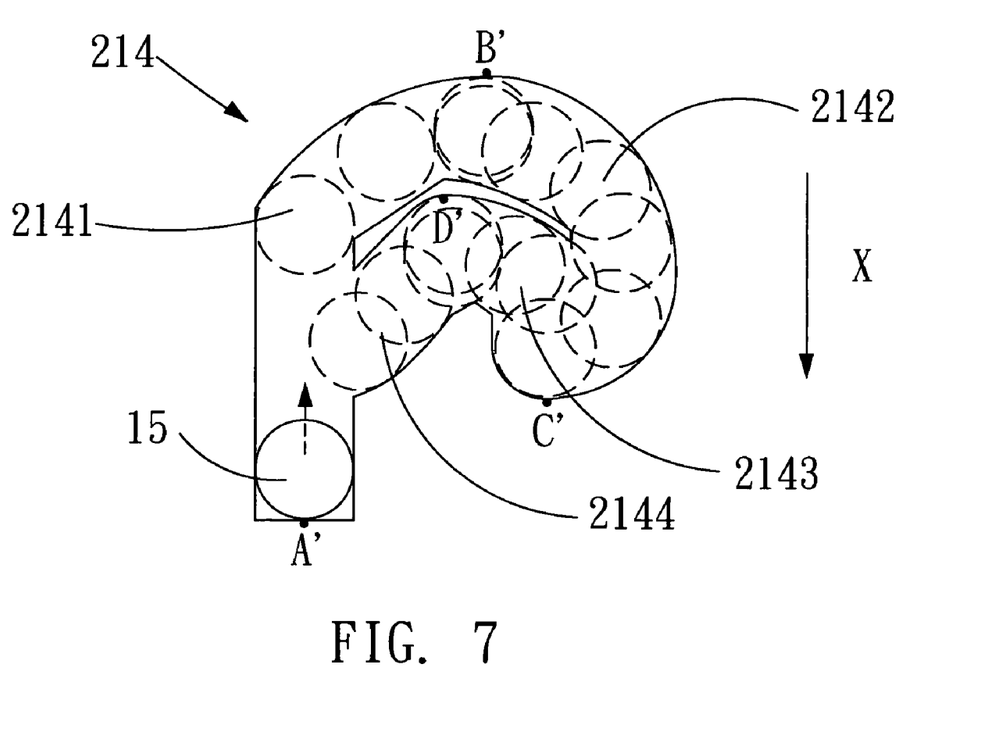
FIG. 7 is an expanded view of a groove of another embodiment of a bobbin of the present invention.

FIG. 7 is an expanded view of a groove according to another embodiment of the present invention. A groove 214 is disposed at the inner wall of the bobbin 11. The ball 15 is received in the groove 214 and the recess 121 of the rod 12 at the same time. The groove 214 is substantially ρ-shaped and includes a first shrinking groove 2141, a first retreating groove 2142, a second shrinking groove 2143 and a second retreating groove 2144 connected to each other to form a closed loop. The first shrinking groove 2141 of the groove 214 protrudes inward from the stretching stuck A' point to a first turning point B'. The first retreating groove 2142 protrudes outward from the first turning point B' to the shrinking stuck point C'. The second shrinking groove 2143 protrudes inward from the shrinking stuck point C' to a second turning point D'.

The second retreating groove 2144 protrudes outward from the second turning point D' to the stretching stuck point A'. The number of the balls 15 is one.

The rod 12 can move between a stretching position and a shrinking position on the basis of the ball 15 moved along the groove 214, and the detailed description is disclosed as follows.

When the rod 12 is disposed at the stretching position, the ball 15 gets stuck at the stretching stuck point A', and therefore, the rod 12 achieves the normal close function. Next, the rod 12 shrinks via the excitation effect, and the ball 15 moves inward from the stretching stuck point A' to the first turning point B' along the first shrinking groove 2141.

When no voltage is applied to the coil 13, the rod 12 pushes the ball 15 to move outward from the first turning point B' to the shrinking stuck point C' along the first retreating groove 2142 via the outward thrust and then the rod 12 stays at the shrinking position. Thus, the rod 12 is held at a normal open position.

When the rod 12 is disposed at the shrinking position, the ball 15 gets stuck at the shrinking stuck point C'. Next, the rod 12 shrinks via the excitation effect, and the ball 15 moves inward to the second turning point D' along the second shrinking groove 2143.

When the rod 12 is disposed at the shrinking position, the ball 15 gets stuck at the shrinking stuck point C'. Next, the rod 12 shrinks via the excitation effect, and the ball 15 moves inward to the second turning point D' along the second shrinking groove 2143.

When no voltage is applied to the coil 13, the rod 12 pushes the ball 15 to move outward from the second turning point D' to the stretching stuck point A' along the second retreating groove 2144 via the outward thrust and then the rod 12 stays at the stretching position. Thus, the rod 12 is held at a normal close position.

In summary, the solenoid valve of the present invention achieves the normal open function and a normal close function via at least a ball, the multiple-turning-point groove of the bobbin, and the recess of the rod, and the advantages, such as power saving, decreased number of elements, a more simplified manufacturing process, decreased manufacturing costs and a more simplified circuit design, are provided. The mechanism design of the invention eliminates the permanent magnet and the attached mechanism. Moreover, the self-latch solenoid valve provides an impulse voltage, thus, other complex circuits are not added and the solenoid valve can be controlled for switching. Energy resource waste is decreased and power is saved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A solenoid valve comprising:
   a bobbin having a through hole and a groove;
   a coil wound around the bobbin;
   a rod disposed in the through hole and capable of moving in a reciprocating fashion along a longitudinal direction without circumferential movement along the through hole, and having a recess disposed on the outer wall of the rod; and
   at least a ball received in the groove and the recess at the same time and confined therein for circumferential movement;
   wherein the groove is constructed by a first shrinking groove, a first retreating groove, a second shrinking groove and a second retreating groove, and has multiple turns.

2. The solenoid valve as claimed in claim 1, wherein the rod is a movable iron core, and the ball is a steel ball.

3. The solenoid valve as claimed in claim 1, wherein one part of the ball is disposed in the groove and the other part of the ball is disposed in the recess, and when the rod moves inward or outward along the through hole, the ball moves in the groove.

4. The solenoid valve as claimed in claim 1, wherein the multiple turns include a first turn, a second turn and a third turn, wherein the first shrinking groove extends from a stretching stuck point to the first turn, the first retreating groove extends from the first turn to the second turn, the second shrinking groove extends from the second turn to the third turn, and the second retreating groove extends from the third turn to the stretching stuck point.

5. The solenoid valve as claimed in claim 4, wherein the ball is disposed at the stretching stuck point when the rod is disposed at a stretching position by applying an outward force; and the ball is disposed at the second turn when the rod is disposed at a shrinking position by applying the outward force.

6. The solenoid valve as claimed in claim 5, wherein the outward force is a gravity or an elastic push.

7. The solenoid valve as claimed in claim 6, further comprising a spring disposed in a depression of the bottom portion of the rod, or telescoped onto the rod for providing the outward force.

8. The solenoid valve as claimed in claim 5, wherein the rod generates an excitation effect by supplying a voltage to the coil for a magnetic attraction to control a moving direction of the rod.

9. The solenoid valve as claimed in claim 8, wherein the voltage is an impulse voltage or a transient digital signal.

10. The solenoid valve as claimed in claim 8, wherein when the rod is disposed at the stretching position, the ball gets stuck at the stretching stuck point.

11. The solenoid valve as claimed in claim 8, wherein when the rod shrinks via the excitation effect, the ball moves inward from the stretching stuck point to the first turn along the first shrinking groove.

12. The solenoid valve as claimed in claim 8, wherein when no voltage is at the coil, the rod pushes the ball to move outward from the first turn to the second turn along the first retreating groove and then the rod stays at the shrinking position.

13. The solenoid valve as claimed in claim 8, wherein when the rod is disposed at the shrinking position, the ball gets stuck at the second turn.

14. The solenoid valve as claimed in claim 8, wherein when the rod shrinks via the excitation effect, the ball moves inward from the second turn to the third turn along the second shrinking groove.

15. The solenoid valve as claimed in claim 4, wherein the groove comprises a plurality of substantially M-shaped grooves.

16. The solenoid valve as claimed in claim 15, wherein the number of the balls is equal to or less than that of the substantially M-shaped grooves.

17. The solenoid valve as claimed in claim 16, wherein when the number of the balls is more than one, the positions of the balls substantially correspond to the substantially M-shaped grooves.

18. The solenoid valve as claimed in claim 4, wherein the groove comprises a substantially r-shaped groove.

19. The solenoid valve as claimed in claim 18, wherein the first shrinking groove, the first retreating groove, the second shrinking groove and the second retreating groove connected to each other to form a closed groove.

\* \* \* \* \*